(12) United States Patent
Kienzle

(10) Patent No.: US 8,910,183 B2
(45) Date of Patent: Dec. 9, 2014

(54) ACCESS TO CONTEXT INFORMATION IN A HETEROGENEOUS APPLICATION ENVIRONMENT

(75) Inventor: Matthias Kienzle, Mannheim (DE)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 13/213,084

(22) Filed: Aug. 19, 2011

(65) Prior Publication Data
US 2013/0046963 A1 Feb. 21, 2013

(51) Int. Cl.
G06F 3/00 (2006.01)
G06F 9/54 (2006.01)

(52) U.S. Cl.
CPC ........................................ *G06F 9/54* (2013.01)
USPC .......................................................... 719/313

(58) Field of Classification Search
None
See application file for complete search history.

(56) References Cited

U.S. PATENT DOCUMENTS

| | | | |
|---|---|---|---|
| 8,613,004 B2 * | 12/2013 | Hacigumus et al. | 719/328 |
| 8,763,010 B2 * | 6/2014 | Hacigumus et al. | 719/313 |
| 2004/0068714 A1 * | 4/2004 | Deimel et al. | 717/101 |
| 2004/0111397 A1 * | 6/2004 | Chen et al. | 707/3 |
| 2004/0189685 A1 * | 9/2004 | Wong et al. | 345/708 |
| 2005/0216438 A1 | 9/2005 | Werner | |
| 2010/0070484 A1 * | 3/2010 | Kraft et al. | 707/706 |

FOREIGN PATENT DOCUMENTS

EP     1296253 A1 * 3/2003

* cited by examiner

*Primary Examiner* — H S Sough
*Assistant Examiner* — Carina Yun

(57) ABSTRACT

Various embodiments of systems and methods to provide access to context information in a heterogeneous application environment are described herein. The context information of a source application is received. The context information is based on the execution of the source application. Further, the context information is stored in one or more context vectors of a global context unit, the one or more context vectors corresponding to the source application and one or more target applications. Furthermore, access to the context information of the global context unit is provided for the one or more target applications upon receiving invoking access indication from the one or more target applications. Also, the source application and the one or more target applications are integrated with the global context unit.

21 Claims, 6 Drawing Sheets

ACCESS TO CONTEXT INFORMATION IN A HETEROGENEOUS APPLICATION ENVIRONMENT

FIELD

Embodiments generally relate to computer systems and more particularly to methods and systems to provide access to context information in a heterogeneous application environment.

BACKGROUND

An enterprise typically includes heterogeneous applications working on disparate technology environments. Many a times, an application requires context information of another application for processing. In other words, the applications are interdependent (i.e., a first application may require specific context information which is processed by a second application). The context information may be a name-value pair, where the name represents a key or an attribute or a context identifier in which the value or the information is stored. Further, the layers of the applications may defer, i.e., one application may have user interface rendering, another application may use data caching, yet another application may use a database, one other application may call an external service with or without application programming interface (API), and so on. In general, the applications in the enterprise have structures or architectures that are mutually heterogeneous and the direct communication between the applications does not exist. However, heterogeneous applications may require communicating with one another in the enterprise.

In existing methods, the context information of one application is communicated manually to another application, which can be error prone. Additionally, both applications may use different languages for a same word (e.g., 'room' (English), 'chambre' (French), 'zimmer' (German) and so on), which may lead to confusion during manual communication between the applications. Also, automatically transferring context information from one application to another application may require changes in the programming of the applications. For example, the context information would have to be taken from the cache (of the first application) to an API in the second one. There may be economically no justifcation to program the interfaces. Moreover, setting the context information in a buffer or in a shared memory may lead to design or architectural changes in the applications. Therefore, it is desirable to provide a method which enables integration of heterogeneous applications without any change in the architecture of the applications.

SUMMARY

Various embodiments of systems and methods to provide access to context information in a heterogeneous application environment are described herein. In one aspect, context information of a source application is received. The context information is based on the execution of the source application. Further, the context information is stored in one or more context vectors of a global context unit. The one or more context vectors correspond to the source application and one or more target applications. Furthermore, access to the context information of the global context unit is provided for the one or more target applications upon receiving invoking access indication from the one or more target applications. In another aspect, the source application and the one or more target applications are integrated with the global context unit.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques to provide access to context information in a heterogeneous application environment are described herein. Heterogeneous application environment includes a plurality of applications such as Customer Relationship Management (CRM), Enterprise Resource Planning (ERP) and so on, from different manufacturers, working on disparate technology environments such as Java, .Net and the like and with different functionalities (e.g., user interface rendering, web application configuration, application programming interface (API), and so on).

According to one embodiment, the context information of an application is made accessible to other applications in the heterogeneous application environment through a global context unit during runtime. During design time, the applications in the heterogeneous application environment are integrated with the global context unit. Therefore, the context information provided by the application can be accessed by other applications in the heterogeneous application environment without making any change in the architecture of the applications. Also, the context information in the global context unit can be accessed using simple methods without any knowledge of internal architecture of the applications.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
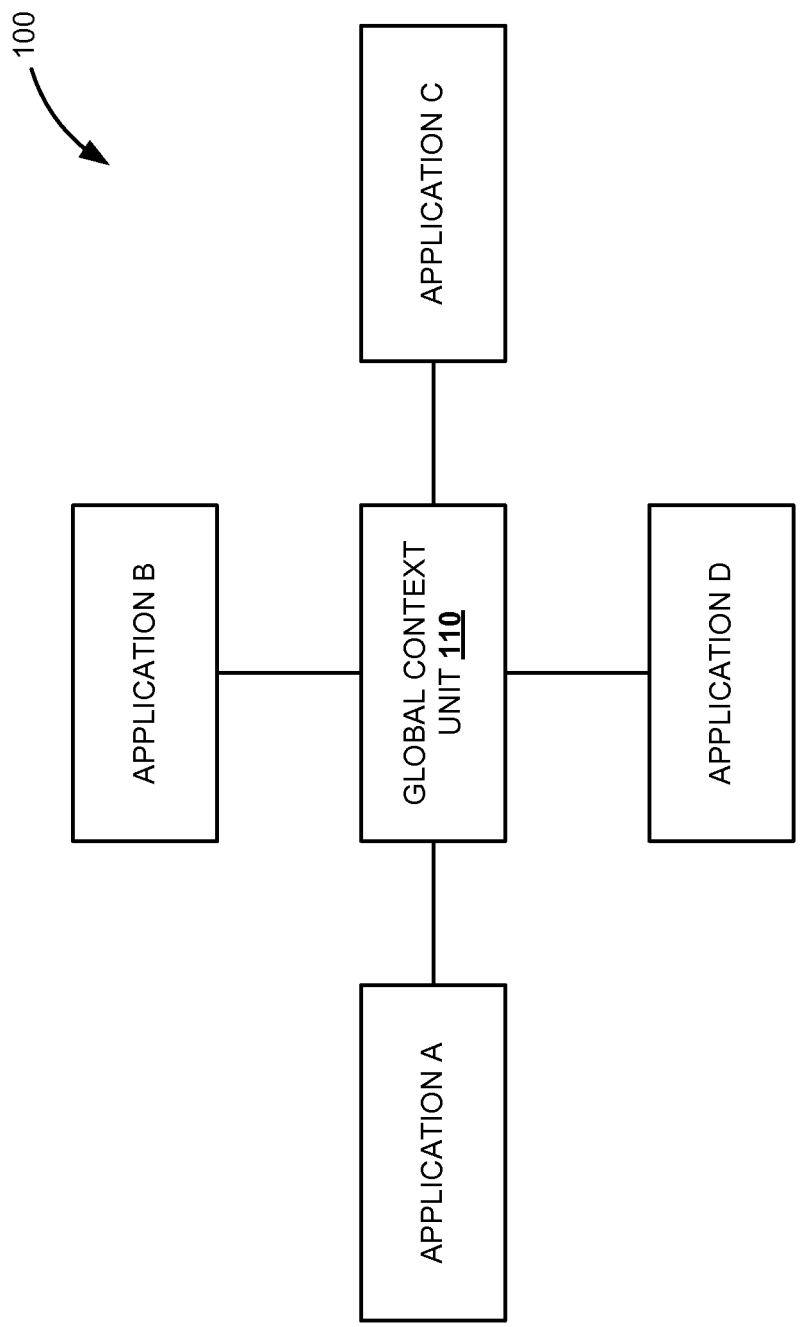
FIG. 1 is a block diagram illustrating a heterogeneous application environment, according to an embodiment.

FIG. 1 is a block diagram illustrating a heterogeneous application environment 100, according to an embodiment. In one exemplary embodiment, the heterogeneous application environment 100 can include a plurality of applications (e.g., applications A to D), which are communicatively coupled to a global context unit 110. In one embodiment, the applications (e.g., applications A to D) are integrated with the global context unit 110 during design time. The integration of the applications (e.g., applications A to D) and the global context unit 110 is described in greater detail in FIG. 3. The applications (e.g., application modules A to D) can be heterogeneous applications running on one or more computer systems, having different functionalities and operated by at least one user.

In one exemplary embodiment, the applications (e.g., applications A to D) can be a source application and/or a target application. The source application is a context information provider module and the target application is a context information user module. For example, consider an enterprise that provides lodging facility such as a hotel. Suppose that the enterprise utilizes two applications provided by two different manufacturers. The first application organizes allocation of rooms to the guests and the second application facilitates service management. The second application may require context information from the first application. For example, if the execution of the first application reports that an electronic device in a room is not working, then the second application has to operate to fix the issue as the second application provides service management. Thereby, the first application acts as the source application and the second application acts as the target application.

In one exemplary operation, the global context unit 110 receives the context information of the source application (e.g., the particular room number, in which the electronic device is not working, is received from the source application). Further, the received context information is stored in the context vector of the global context unit 110. Furthermore, access to the stored context information is provided to the target application upon receiving invoking access indication (e.g., access to the particular room number is provided to the target application).

In one exemplary embodiment, only the context information declared by the source application is stored in the global context unit 110. For example, the room number (i.e., room having a problem with the electronic device) may be associated with the guest name, pricing details, and the like. However, only the room number is declared in the global context unit 110 and the other details associated with the room are not declared. Thus, only the context information desired by the source application is made accessible and the other details are not accessible. The other details are often considered sensitive (e.g., the guest name is considered confidential by the enterprise). The method of providing access to the context information in the global context unit 110 and declaring the context information are described in greater detail in FIGS. 2 and 3.

Figure 2:
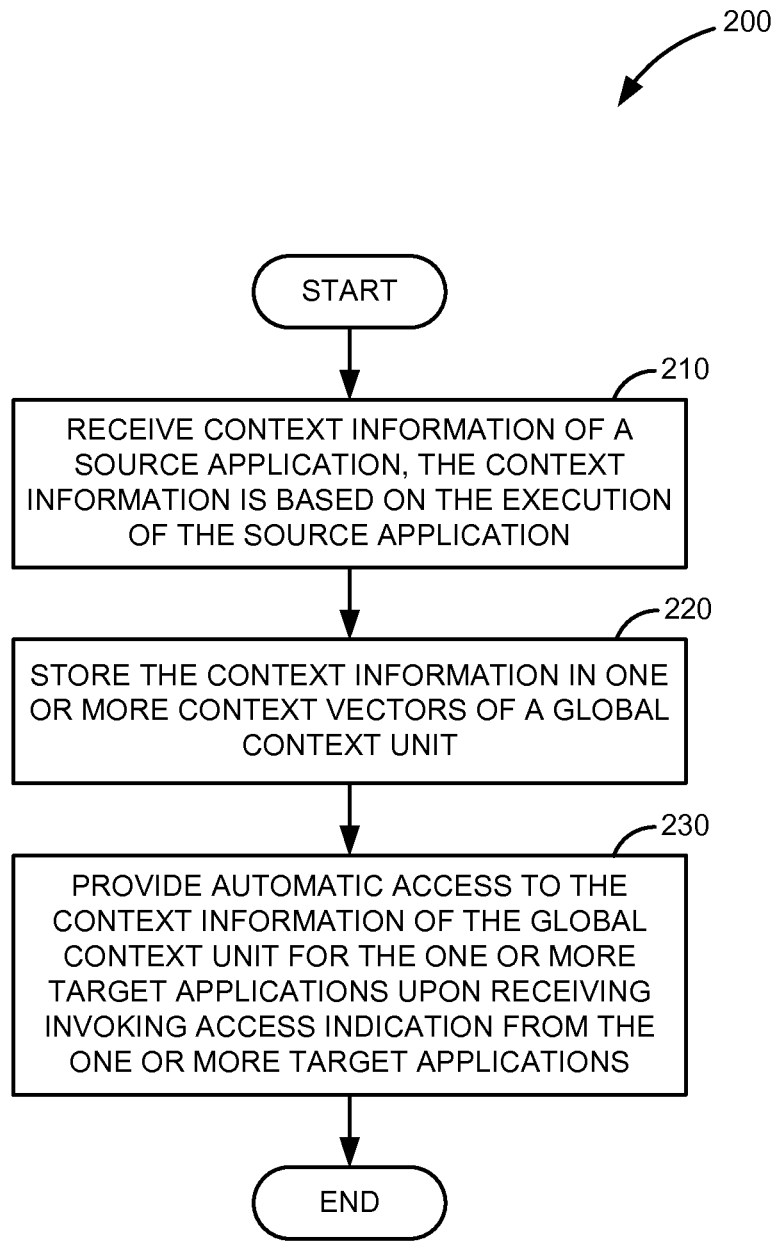
FIG. 2 is a flow diagram illustrating a method to provide access to context information in a heterogeneous application environment, according to an embodiment.

FIG. 2 is a flow diagram 200 illustrating a method to provide access to context information in a heterogeneous application environment, according to an embodiment. At step 210, context information of a source application is received. The context information is based on the execution of the source application. The context information includes a name-value pair. For example, 'employee_ID' (e.g., 'employee__27' represents information of an employee having ID number 27), 'room_ID' (e.g., 'room__13' represents information of the room having identifying number 13) and the like. In one exemplary embodiment, receiving the context information of the source application can be achieved by simple method 'Set_Value'. Receiving the context information of the source application is described with an example in FIG. 3.

At step 220, the context information is stored in one or more context vectors of a global context unit. The context vectors are corresponding to the source application and the target applications. In one exemplary embodiment, the context vectors include the context information related to one or more specific application processes carried out at the source application and the target applications. For example, consider 'A_Vector' and 'B_Vector' as context vectors defined by the source application and the target application respectively during integration with the global context unit (described in greater detail in FIG. 3). Further, the context ID is defined by the source application or the target application. The source application and the target application define access to the defined context ID. (e.g., the source application declared to set the context ID 'Room_ID' and the target application declared to get the context ID 'Room_ID'). In operation, when the context information 'Room_No' is received, the context information 'Room_No' is stored in the context IDs 'Room_ID'. Further, the context information in the context ID can be accessible through all the context vectors (e.g., 'A_Vector', 'B_Vector' and the like) that have the context ID assigned. Defining the context vector, assigning the context IDs to the context vector, and integrating the source application and the target application with the global context unit are described in greater detail in FIG. 3.

At step 230, access to the context information in the global context unit is provided for the one or more target applications upon receiving invoking access indication from the one or more target applications. In other words, when the target applications invoke access to the context information of the global context unit, the access to the context information of the global context unit is provided. In one exemplary embodiment, the target applications invoke access to the context information stored in the global context unit during execution commencement of the target applications. For example, when the target application invokes access to the context ID 'Room_ID', then the context information stored in the global context unit under 'Room_ID' is provided to the target application. In one exemplary embodiment, invoking access to the context information stored in the global context unit is achieved by simple method 'Get_Value'. Invoking access to the context information stored in the global context unit is described with example in FIG. 3.

In one exemplary embodiment, the source application and the target applications can be heterogeneous applications running on one or more computer systems. Further, the heterogeneous applications are integrated with the global context unit. Integration of the heterogeneous applications with the global context unit is described in greater detail in FIG. 3.

Figure 3:
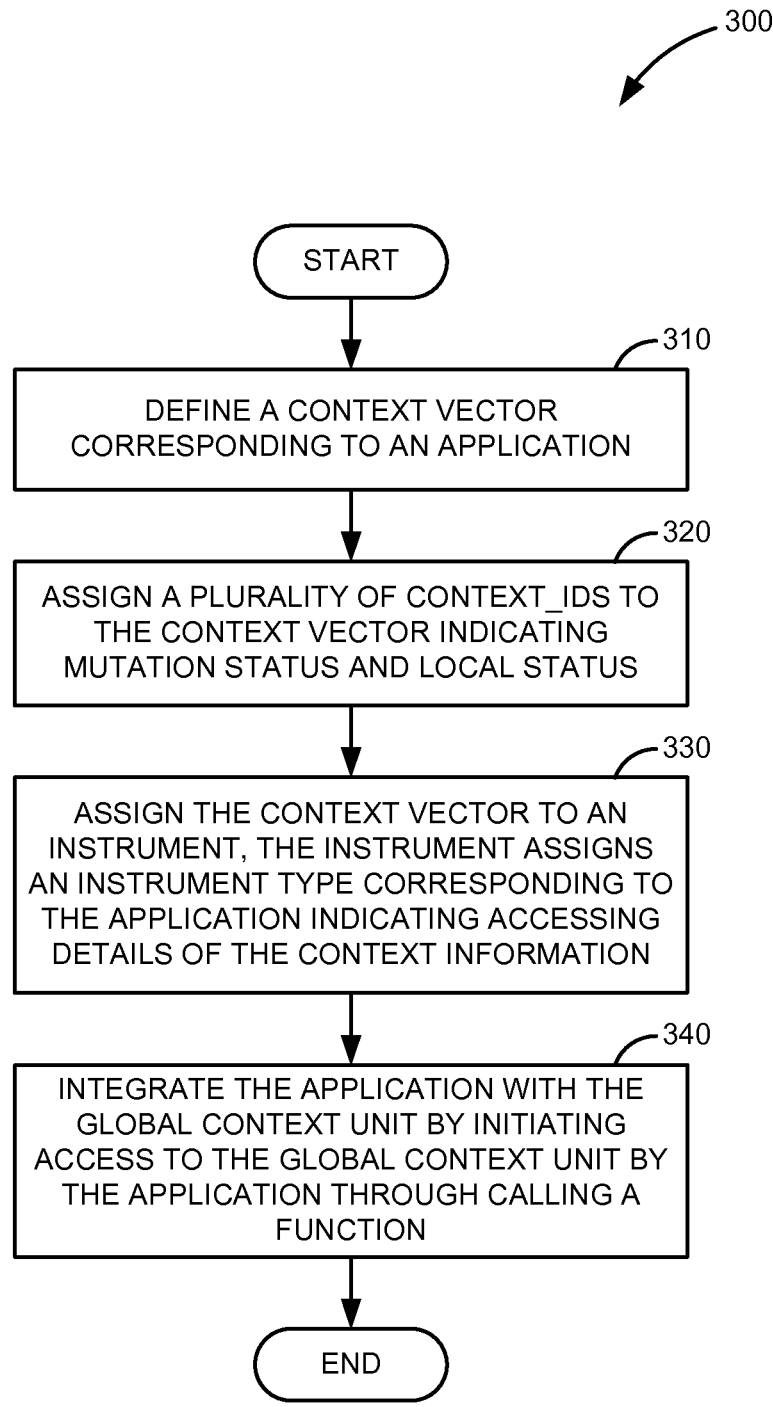
FIG. 3 is a flow diagram illustrating a method for integrating heterogeneous applications with a global context unit, according to an embodiment.

FIG. 3 is a flow diagram 300 illustrating a method for integrating heterogeneous applications with a global context unit, according to an embodiment. At step 310, a context vector corresponding to an application of the heterogeneous applications is defined. In one exemplary embodiment, the applications can be source applications and/or target applications. For example, consider an application 'A' as a source application and an application 'B' as a target application. The application 'A' defines a context vector 'A_Vector' at the global context unit. Similarly, the application 'B' defines a context vector 'B_Vector'.

At step 320, a plurality of context IDs is assigned to the defined context vector by the application indicating mutation status and local status. For example, the application 'A' assigns the context ID 'A_Selection' to the context vector 'A_Vector' and indicate it as 'Mutating'. In one exemplary embodiment, the status 'Mutating' indicates that the value of the context ID can be manipulated by the application process carried out by the target applications utilizing 'A_Vector'. Similarly, the application 'B' assigns the context ID 'A_Selection' to the context vector 'B_Vector' and setting as 'Mutating'. In one exemplary embodiment, mutating may be possible for the context vector 'B_Vector', if the definition of the context ID 'A_Selection' allows context vectors other than the context vector 'A_Vector'. Thereby access control or authority management within the global context unit can be achieved. Also, the status 'Mutating' can be marked if the application 'B' desires to change the value of the context ID 'A_Selection', such as deleting it after reading it, and the like.

In one exemplary embodiment, the assigned context IDs can be defined as 'Local' indicating whether the context information is accessible from outside the origin vector. For example, the application 'A' (i.e., the source application) can set the context ID as 'Local' as it can limit the access to the context ID to the application 'A' itself. In other words, if the context ID is marked as 'Local' during design time, the context ID may not be assigned to any other context vector, but the origin context vector.

At step 330, an instrument is assigned to an instrument type corresponding to the application indicating accessing details to the context information. Further, the context vectors get assigned to the instrument. In one embodiment, the instrument type defines the type of the application such as an application programming interface, a web application, a user interface, an application on the server, and the like (in general, the instrument type defines a runtime application). For example, the application 'A' can be assigned to the instrument type 'web application' to indicate that the application 'A' is a web application at runtime. Similarly, the application 'B' assigns 'user interface' as the instrument type. Additionally, the instrument type indicates the global context unit to distinguish runtime information available and which part of it describes the running application asking for access to the global context unit. In one exemplary embodiment, the instrument type requires a perceiver assigned to it, as these perceivers are able to interpret runtime information and find the name of an application, based on the instrument type.

At step 340, the application is integrated with the global context unit by initiating access to the context information of the global context unit by the application through calling a function. For example, the application 'A' is integrated with the global context unit by calling the function as follows:

```
DATA LO_GLOBAL_CONTEXT TYPE REF TO
IF_BS_CONTEXT_GLOBAL.
DATA LV_SELECTION TYPE STRING.
LV_SELECTION = 'MY_SELECTION'.
LO_GLOBAL_CONTEXT ?=
CL_BS_CONTEXT_FACTORY=>GET_GLOBAL_CONTEXT( ).
LO_GLOBAL_CONTEXT->SET_VALUE(
IV_ID = 'A_SELECTION'
IV_VALUE = LV_SELECTION).
```

Thereby, when the above function is executed, the application 'A' is integrated with the global context unit and the context ID 'A_Selection' is set by the application 'A' using a method 'Set_Value'. Similarly, the application 'B' is integrated with the global context unit as follows:

```
DATA LO_GLOBAL_CONTEXT TYPE REF TO
IF_BS_CONTEXT_GLOBAL.
DATA LV_SELECTION TYPE STRING.
LO_GLOBAL_CONTEXT ?=
CL_BS_CONTEXT_FACTORY=>GET_GLOBAL_CONTEXT( ).
LO_GLOBAL_CONTEXT->GET_VALUE(
EXPORTING IV_ID = 'A_SELECTION'
IMPORTING EV_VALUE = LV_SELECTION).
LO_GLOBAL_CONTEXT->CLEAR_VALUE( 'A_SELECTION' ).
```

Thereby, when the above function is executed, the application 'B' is prepared to take over the context information from global context unit using a method 'Get_Value'. In another exemplary embodiment, accesses to the context information of the global context are independent. Hence, the application 'A' accesses 'A_Selection' setting the value and the application 'B' accesses A_Selection by getting the value. Further, the application 'B' may access 'A_Selection' earlier then the application 'A' (wherein the application 'B' may not get the value of 'A_Selection'). It is appreciated that the initiating of the global context unit needs to be done only once. In other words, the applications are integrated with the global context unit only once and the applications In another exemplary embodiment, an application includes one or more runtime components such as function modules, reports and the like, and the components may not be connected to each other (i.e., different types of components in an application). In this scenario, the global context unit is used to provide access to the context information of one component to another component.

During design time, the application defines a context vector 'My_Vector'. Further, the application assigns the context ID 'My_Info' to the context vector 'My_Vector' and indicates it as 'Mutating', to set the context-ID(s) value(s) within the context vector 'My_Vector'. Further, the status of 'Local' is set as the other applications that are not associated with the context vector 'My_Vector' may not be able to access the context information. Furthermore, the instrument is assigned to the instrument type and the context vector 'My_Vector' is assigned to the instrument. Then, the application is integrated with the global context unit by initiating access to the context information of the global context unit by the application through calling the function. For example, the application can set or read the context information of the desired context IDs by calling the function as follows:

```
DATA LO_GLOBAL_CONTEXT TYPE REF TO
IF_BS_CONTEXT_GLOBAL.
DATA LV_INFO TYPE STRING.
LV_INFO = 'IMPORTANT STUFF'.
LO_GLOBAL_CONTEXT ?=
CL_BS_CONTEXT_FACTORY=>GET_GLOBAL_CONTEXT( ).
LO_GLOBAL_CONTEXT->SET_VALUE(
IV_ID = 'MY_INFO' IV_VALUE = LV_INFO).
DATA LO_GLOBAL_CONTEXT TYPE REF TO
IF_BS_CONTEXT_GLOBAL.
DATA LV_INFO TYPE STRING.
LO_GLOBAL_CONTEXT ?=
CL_BS_CONTEXT_FACTORY=>GET_GLOBAL_CONTEXT( ).
LO_GLOBAL_CONTEXT->GET_VALUE(
EXPORTING IV_ID = 'MY_INFO'
IMPORTING EV_VALUE = LV_INFO).
```

In yet another exemplary embodiment, an application can be a reuse-component (e.g., API, web application and the like). The reuse-component may not be a stand-alone application. However, it enhances other applications by its functionality. In one embodiment, the reuse-component can access the context information from the global context unit and also the reuse-component can set or define the context information in the global context unit.

In one embodiment, apart from 'Set_Value' and 'Get_Value' methods as described above, other methods are used to access details of the context information, such as 'Get_Context_Vector' returns the name of the context vector that has been determined during the first instantiation of the global context unit by reading current runtime information, 'Get_Context_ID_Origin' returns the name of the context vector that is defined as origin vector for the given context ID, 'Get_Context_ID_Type' returns the name of the type that describes the value of the given context ID, and 'Is_Context_ID_Concerted', returns the value if the given context ID is concerted in the current vector (i.e., applications that are integrated with the global context unit can ask for existence of a particular context ID by calling 'Is_Context_ID_Concerted').

Further, 'Is_Context_ID_Mutable' returns the value if the value of the given context ID is changeable, 'Clear_Origin_IDs_Values' deletes all context information that has its origin in the current context vector, 'Request_Solo', requests exclusive access, hereinafter 'a solo' for the given context ID (i.e., this is the technique used to get exclusive mutating access to a specific context ID's value, as soon as one application requested the solo no other application is capable of changing the context ID's value. Also, the application component might request the solo, so any other application components may not be able to change the context ID, even though the other application components are within the same application), 'Start_Solo' activates the given solo so that only the related context information can be manipulated, and 'Stop_Solo' deactivates solos so that context information can be manipulated. It is to be noted that the only a requester of the solo is capable of starting the solo afterwards, as only the requester knows the solo ID necessary for that.

Figure 4:
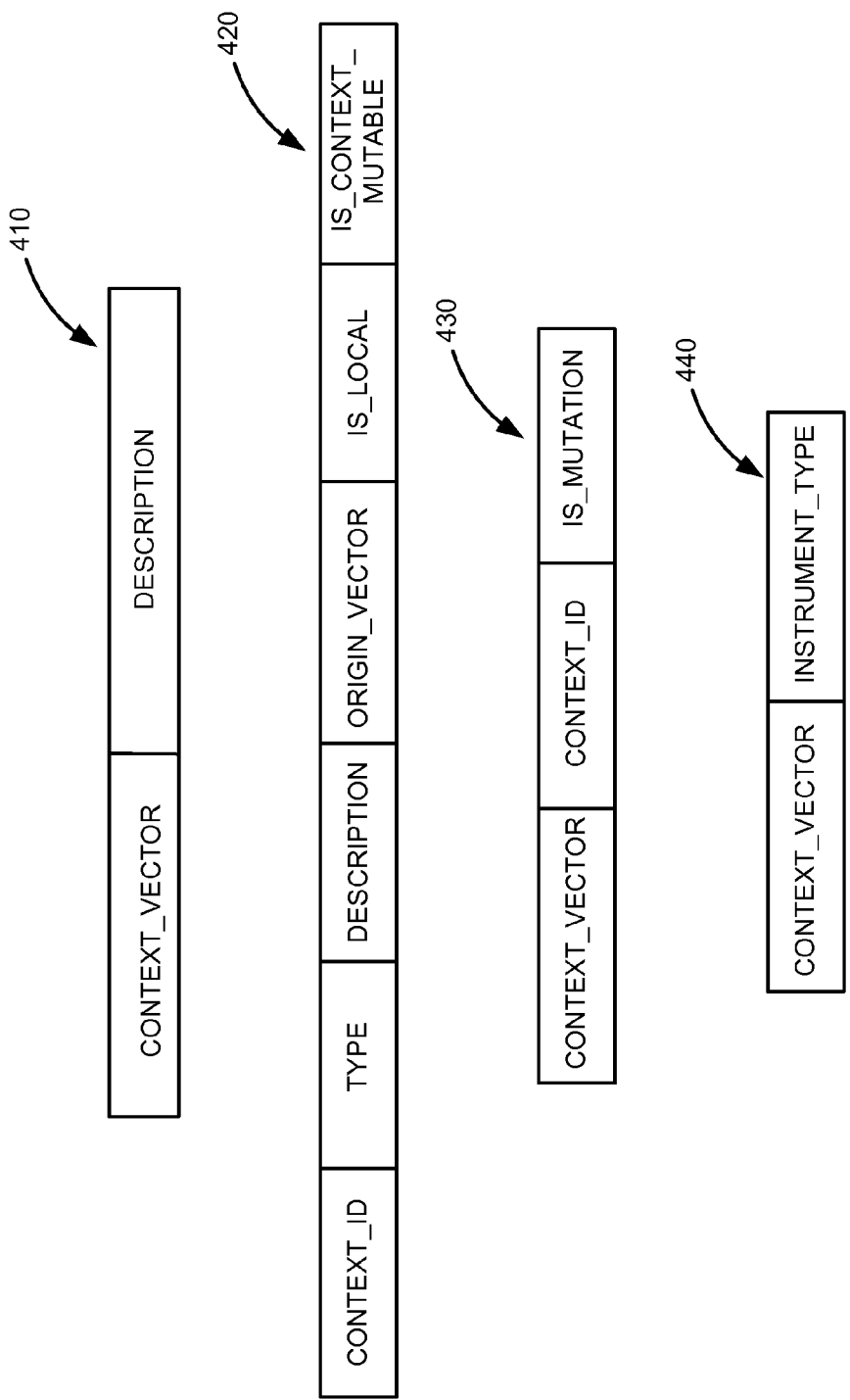
FIG. 4 is a block diagram illustrating structure of a global context unit, according to an embodiment.

FIG. 4 is a block diagram illustrating structure of global context unit, according to an embodiment. The global context unit structure includes one or more context vectors corresponding to applications in a heterogeneous application environment. In one embodiment, context vector 410 represents a kind of grouping of context information IDs that is of interest for a specific application process carried out at an application. The application can be a source application and/or a target application. In one exemplary embodiment, the context information IDs do not necessarily need to be connected logically in the context vector 410. The context vector 410 describes the application process to make use of the context information IDs. The context vector 410 can be represented as 'Context_Vector', describing a unique vector name (e.g., A_Vector) along with a field 'Description', describing short description of the context vector (e.g., A_Description).

In one embodiment, the context ID 420 defines context information which can be made available globally. In other words, the context ID 420 describes the context information which can be made available to the target applications. The description of the context ID 420 includes 'Context_ID' describing a unique ID for the context information (i.e., name of the context information, e.g., A_ID), 'Type' describing type of the context information (e.g., A_Type), 'Description' describing short description of the context information (e.g., A_ID_Desciption), 'Origin_Vector' describing origin vector of the context ID (e.g., A_Origin_Vector), 'Is_Local' indicating whether the context information is accessible from outside the origin vector (e.g., setting A_Local as 'true') and 'Is_Context_Mutable' indicating whether the context information can be changed from outside the origin vector (e.g., setting A_Mutable as 'true').

In one embodiment, a plurality of Context_IDs can be assigned to the Context_Vector. In other words, same context information can be assigned a plurality of context vectors at the same time. Further, to allow an application process carried out using the context vector to change the value of the Context_ID, the field 'Is_Mutating' needs to be activated.

In one embodiment, the Context_Vector is assigned to an instrument. The instrument is assigned to an Instrument_Type describing a runtime instance of the application (e.g., API, web application and the like). This defines for instance that for a specific Instrument_Type only a particular set of context IDs is relevant and used. With the instrument, the actual runtime instance can be determined. As multiple runtime instances overlap each other potentially, a prioritization is being achieved by sequencing the instrument types. In other words, it is only possible to assign one single Context_Vector to a particular runtime instance (i.e., a single application).

Figure 5:
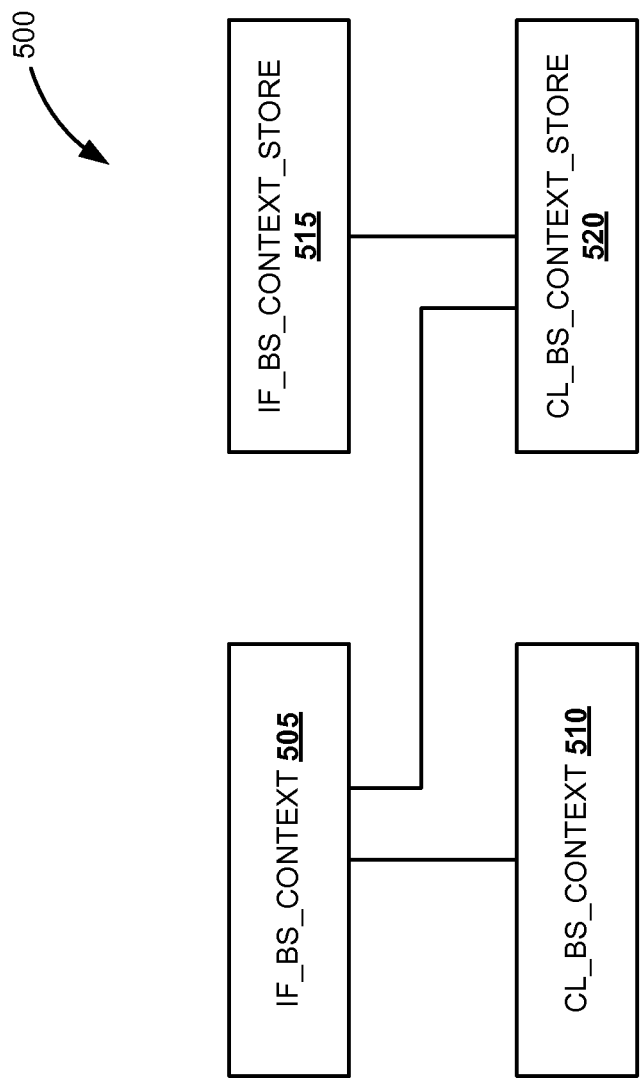
FIG. 5 is a block diagram illustrating a simple context management, according to an embodiment.

FIG. 5 is a block diagram 500 illustrating a simple context management, according to an embodiment. The simple context information management can be achieved by three basic methods in an interface based protocol by which the simple context information can be manipulated or read such as 'Set_Value' sets a value for the Context_ID; 'Get_Value' reads the value of the Context_ID; and 'Clear_Value' deletes the value of the Context_ID (as described in FIG. 2). In one exemplary embodiment, the simple context management includes an interface IF_BS_Context 505, an implementing class CL_BS_Context 510, a dedicated interface IF_BS_Context_Store 515 and a simple context store CL_BS_Context_Store 520. In function, the interface for accessing the context information is IF_BS_Context 505 and the interface IF_BS_Context 505 is created through a factory pattern as an instance of the implementing class CL_BS_Context 510. The implementing class CL_BS_Context 510 has one or more methods to deliver a type of context. For example, a simple context method 'Get_Context' reads the context information. In one embodiment, the context instance (such as object instance of the implementing class CL_BS_Context 510) stores contextual information in a sorted internal table that is manipulated or read according to the simple methods described above. Further, to save the context instances, the context management use the context stores that carry both the generation and the storage of individual instances of the context information and apply to the dedicated interface IF_BS_Context_Store 515. Therefore, context factory generates and stores the requested context instance not by itself, but passes that task to the special context store. The implementating class for the simple context store is CL_BS_Context_Store 520. The simple context store CL_BS_Context_Store 520 stores the context instances in a form of a table that is sorted by context names.

In one exemplary embodiment, the context information in the context store described above can include at least one of simple context information, historical context information and shared memory context information. The simple context information management, the historical context information management and the shared memory context information management use different methods to store the context information. In one embodiment, the context information stored in the global context unit is based on the shared memory context management that is based on the simple context management. Therefore, as the context information in the global context unit can be accessed using three simple methods such as 'Set_Value', 'Get_Value' and 'Clear_Value', the method may not require the knowledge of internal architecture of the source application, the target application, and even the global context unit.

In one embodiment, the method described above can be implemented to a historical stack including historical context information. The historical context is based on the simple context and works on the principle of historical stack memory management. The principle of historical stack memory management includes: when the last entry is popped from the stack memory, it remains in the stack memory and a pointer of the stack memory points to the entry below, and the entries above the current stack level pointer is deleted when new data or context information entries arrive. Further, the historical context information can be accessed using the simple methods (such as 'Set_Value', 'Get_Value' and 'Clear_Value'). In one exemplary embodiment, in addition to the basic methods of the simple context interface, additional methods are used to access the historical context information, such as 'Memorize' pushes a copy of the context information to the historical stack, 'Back' moves the stack pointer of the historical stack downwards and takes over the entry at the stack level, and 'Forward' moves the stack pointer of the historical stack upwards and takes over the entry at the stack level.

In another embodiment, the method described above can be implemented to a shared memory. The shared memory includes a specilized context store to store the context information. The shared memory is the much faster access to data as the shared memory is not stored on and managed by the database server. In one embodiment, the context information in the shared memory can be accessed using the three methods as described above (i.e., 'Set_Value', 'Get_Value' and 'Clear_Value') with the principle of delegation. In one exemplary embodiment, delegation set up the forward calls to the methods to the context information stored in the shared memory. Further, if one of the methods described above is called by the interface, the delegate forwards the request to the context store, which in turn establishes the communication with the shared memory to process the information. Therefore, the method described above provides access to the context information regardless of the duration of storage (e.g., shared memory, buffer and the like) and administrative class (e.g., historical, global and the like).

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
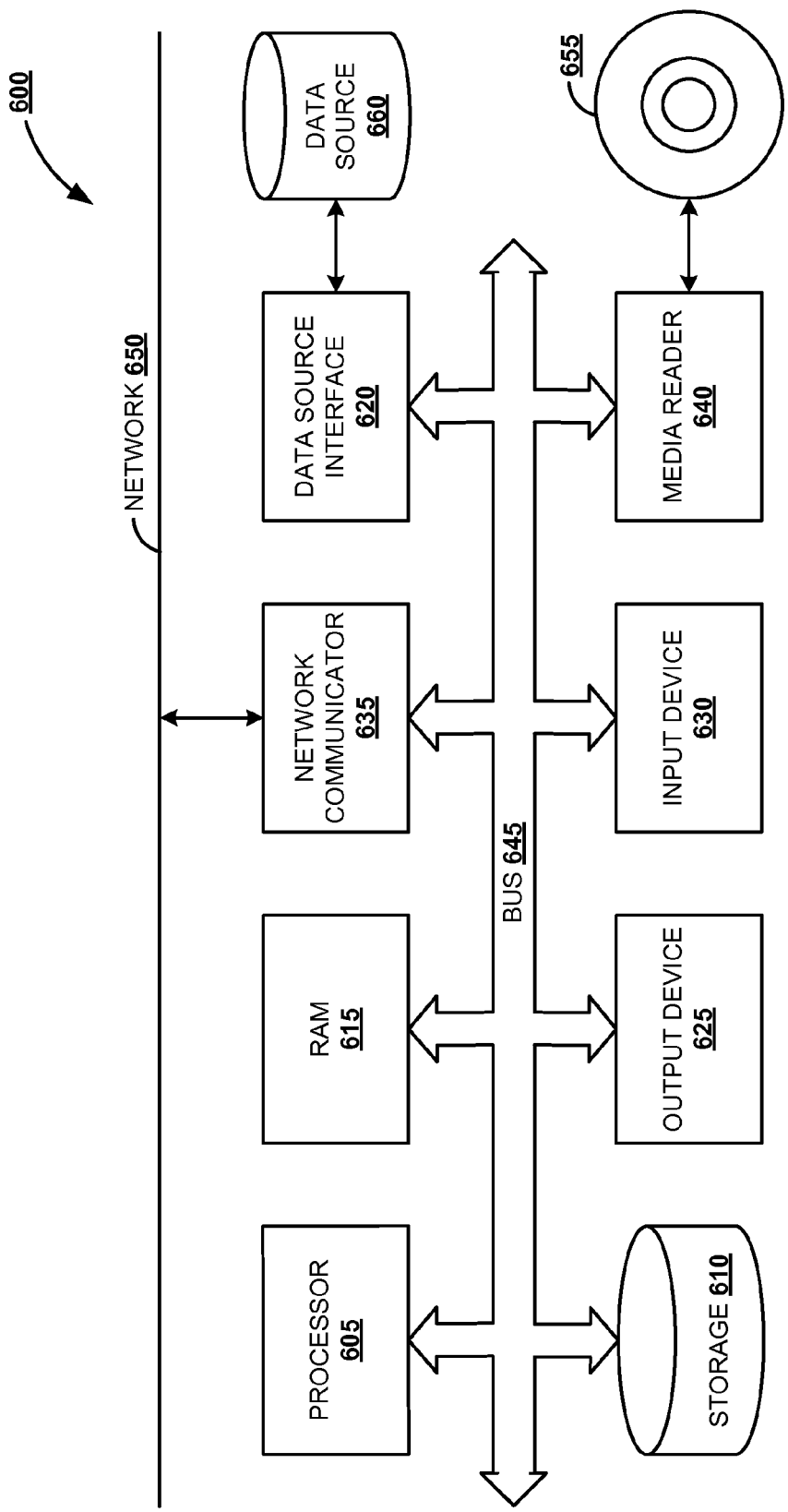
FIG. 6 is a block diagram illustrating a computing environment in which the techniques described to provide access to context information in a heterogeneous application environment, according to an embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
  enable an application to define a context vector, wherein the context vector represents a grouping of context IDs;
  enable a target application to define a target context vector;
  enable the application to assign a context ID to the defined context vector, wherein the context ID includes a description of context information stored in the context ID;
  enable the target application to define invoking access to the context ID;
  integrate the application with a global context unit upon receiving an initiation from the application to access context information of the global context unit;
  receive a current context information of the application, the current context information is based on the execution of the application;
  store the current context information in the context ID associated with the context vector in the global context unit;
  receive a request from the target application to access the context ID through the defined target context vector; and
  provide access to the current context information stored in the context ID in the global context unit for the target application.

2. The article of manufacture of claim 1, wherein the context vector comprises the context information related to one or more specific application processes carried out at the application and the target application.

3. The article of manufacture of claim 1, wherein the global context unit comprises a context store to store the context information, the context store including at least one of simple context information, historical context information and shared memory context information.

4. The article of manufacture of claim 1, wherein the target application invokes access to the context information of the global context unit during execution commencement of the target application.

5. The article of manufacture of claim 1, wherein the application and the target application are heterogeneous application modules.

6. The article of manufacture of claim 5, wherein the heterogeneous applications comprise reuse-application components consisting at least one of an application programming interface, a web application and a user interface rendering.

7. The article of manufacture of claim 1, further comprises instructions to:
  enable the application to indicate an access control status for the assigned context ID; and
  enable the application to assign the context vector to an instrument, wherein the instrument assigns an instrument type indicating a type of the application.

8. The article of manufacture of claim 7, wherein the access control status comprises one of a mutation status indicating manipulation status of the context information associated with the context_ID by the application and a local status indicating that the context information is not accessible from outside the origin of the context vector.

9. The article of manufacture of claim 1, wherein the global context unit comprises:
  one or more context vectors corresponding to the application and the target application; and
  one or more context IDs corresponding to the one or more context vectors specific to an application process.

10. A computer implemented method to provide access to context information in a heterogeneous application environment, the computer implemented method comprising:
  defining a context vector by an application, wherein the context vector represents a grouping of context IDs;
  defining a target context vector by a target application;
  assigning a context ID to the defined context vector by the application, wherein the context ID includes a description of context information stored in the context ID;
  defining invoking access to the context ID by the target application;
  integrating the application with a global context unit by initiating access to context information of the global context unit by the application;
  retrieving a current context information of the application, the current context information is based on the execution of the application;

storing the current context information in the context ID associated with the context vector in the global context unit;

receiving a request from the target application to access the context ID through the defined target context vector; and providing access to the current context information stored in the context ID in the global context unit for the target application.

11. The computer implemented method of claim 10, wherein the context vector comprises context information related to one or more specific application processes carried out at the application and the target application.

12. The computer implemented method of claim 10, wherein the global context unit comprises a context store to store the context information, the context store including at least one of simple context information, historical context information and shared memory context information.

13. The computer implemented method of claim 10, wherein the target application invokes access to the current context information of the global context unit during execution commencement of the target application.

14. The computer implemented method of claim 10, wherein the application and the target application comprise heterogeneous applications running on one or more computer systems.

15. The computer implemented method of claim 14, wherein the heterogeneous applications comprise reuse-application components consisting at least one of an application programming interface, a web application and a user interface rendering.

16. The computer implemented method of claim 10, further comprising:
   indicating, by the application, an access control status for the assigned context ID;
   assigning the context vector to an instrument, wherein the instrument assigns an instrument type indicating a type of the application; and
   assigning the context vector to an instrument, wherein the instrument assigns an instrument type indicating a type of the application.

17. The computer implemented method of claim 16, wherein the access control status comprises one of a mutation status indicating manipulation status of the context information associated with the context_ID by the application and a local status indicating that the context information is not accessible from outside the origin of the context vector.

18. The computer implemented method of claim 10, wherein the global context unit comprises:
   one or more context vectors corresponding to the application and the target application; and
   one or more context IDs corresponding to the one or more context vectors specific to an application process.

19. A system to provide access to context information in a heterogeneous application environment, the system comprising:
   at least one processor communicating with one or more memory devices storing instructions, the instructions comprising:
      a source application; and
      a global context unit communicatively coupled to the source application, the global context unit including instructions to:
         receive an initiation from the source application to access context information of the global context unit;
         in response to receiving the initiation, integrating the source application with the global context unit;
         receive a current context information of the source application, wherein the current context information is based on the execution of the source application;
         store the current context information in a context ID assigned to a context vector of the global context unit, where the context vector represents a grouping of context IDs and the context ID includes a description of context information stored in the context ID, wherein the context vector is defined by the source application; and
         provide access to the current context information stored in the context ID in the global context unit for a target application upon receiving invoking access indication from the target application.

20. The system of claim 19, wherein the source application and the one or more target applications are heterogeneous applications.

21. The system of claim 19, further wherein the source application assigns a plurality of context_IDs to the one or more context vectors indicating one of a mutation status and a local status; and
   assigning the one or more context vectors to an instrument, wherein the instrument assigns an instrument type indicating a type of the application.

* * * * *